(12) United States Patent
Fink

(10) Patent No.: US 7,428,413 B2
(45) Date of Patent: Sep. 23, 2008

(54) METHOD AND SYSTEM FOR PROVIDING NETWORK ACCESS AND SERVICES USING ACCESS CODES

(75) Inventor: Ian M. Fink, Austin, TX (US)

(73) Assignee: Wayport, Inc., Austin, TX (US)

( * ) Notice: Subject to any disclaimer, the term of this patent is extended or adjusted under 35 U.S.C. 154(b) by 575 days.

(21) Appl. No.: 10/797,430

(22) Filed: Mar. 10, 2004

(65) Prior Publication Data
US 2004/0181602 A1 Sep. 16, 2004

(51) Int. Cl.
H04Q 7/20 (2006.01)
(52) U.S. Cl. .............. 455/432.1; 455/452.1; 455/456.1
(58) Field of Classification Search .............. 455/452.1, 455/452.2, 456.1, 456.2, 456.6, 432.1; 379/93.02, 379/93.03; 709/229, 225; 370/352
See application file for complete search history.

(56) References Cited

U.S. PATENT DOCUMENTS

| | | | |
|---|---|---|---|
| 5,805,803 A | 9/1998 | Birrell et al. | |
| 5,889,958 A | 3/1999 | Willens | |
| 5,987,606 A | 11/1999 | Cirasole et al. | |
| 5,996,011 A | 11/1999 | Humes | |
| 6,233,618 B1 | 5/2001 | Shannon | |
| 6,453,419 B1 | 9/2002 | Flint et al. | |
| 6,564,327 B1 | 5/2003 | Klesin et al. | |
| 7,085,840 B2 * | 8/2006 | de Jong et al. | 709/229 |
| 2001/0054101 A1 * | 12/2001 | Wilson | 709/225 |
| 2004/0054774 A1 * | 3/2004 | Barber et al. | 709/224 |

OTHER PUBLICATIONS

Mooney; Service Access Method and Interface; Sep. 3, 1999; WO99/44161.*

* cited by examiner

Primary Examiner—Melur Ramakrishnaiah
(74) Attorney, Agent, or Firm—Craig J. Yudell; Dillon & Yudell LLP

(57) ABSTRACT

An embodiment of the present invention is directed to an authorization and access control system for a venue or a geographic region comprising a plurality of venues. The authorization and access control system provides one or more computing devices selective access to one or more networks and/or services available in a network communications system by distributing a substantially unique string of characters (an "access code") to each user of a computing device. The access code can then be entered via an input device, such as a keyboard or its equivalent, of the computing device. This enables the computing device to gain access to one or more networks and/or services at a venue or in geographic region with the network communications system. Various embodiments are useful and may have several advantages in several venues, such as coffee shops, hotels, train stations, law offices, marinas, truck stops, fueling stations, restaurants, and stores, among others. Additional embodiments may be advantageous in a geographic region which may comprise a plurality of possible venues.

68 Claims, 6 Drawing Sheets

METHOD AND SYSTEM FOR PROVIDING NETWORK ACCESS AND SERVICES USING ACCESS CODES

BACKGROUND OF THE INVENTION

1. Field of the Invention

This invention relates generally to providing and controlling access and/or services in a network communications system, where the network communications system and its methods comprise enabling a network infrastructure to support one or more users and/or one or more venues.

2. Description of Related Art

Various types of wired and wireless infrastructures are being developed to provide High-speed Internet Access (HSIA) to users of computing devices, such as portable computing devices. Currently, numerous providers are attempting to install wired and/or wireless network infrastructures in various locations, such as airports, hotels, office buildings, coffee shops, train stations, law offices, marinas, restaurants, and stores, etc. for use by various users.

A variety of networks are used to implement HSIA today. Computer networks include local area networks (LANs), metropolitan area networks (MANs), wide area networks (WANs), intranets, the Internet and other types of communications networks. Communication networks include those for conventional telephone service, cellular networks of different varieties, paging services and others. Networks are used for many purposes, including to communicate, to access data, and to execute transactions. For many reasons, including security, it is often necessary to confirm or authenticate the identity of a user or some type of authorization, such as an access code, before permitting access to data or a transaction to occur on the network. Further, authentication and/or access control may be of paramount importance in HSIA.

In many venues, a venue owner and/or operator may wish to provide HSIA. The venue owner/operator may wish to charge a fee for access of HSIA, or provide HSIA as an amenity for purchasing goods and/or services from the venue. Authorization and/or access control to network services may be employed to ensure collection of money for access and/or at least a purchase of goods and/or services of the venue may occur as a prerequisite to accessing network services at the venue.

In other instances, a network provider may wish to service multiple venues with a network communications system. This may allow each venue in an area of service an ability to customize and/or provide access control to HSIA provided by the network communication system of the network provider.

SUMMARY OF THE INVENTION

One embodiment of the present invention comprises a system and method for providing access and or service of a network included in a network communications system (NCS) to one or more users. The NCS may include a plurality of access points coupled to a first network. The access points include wireless access points and may also include wired access points. Access points (APs) of the NCS may be widely distributed in various facilities and/or venues, such as airports, hotels, mass-transit stations, and various businesses, such as business offices, restaurants, and stores, e.g., coffee shops or restaurants at an airport. The NCS may comprise a wide area network, such as the Internet. A plurality of venues may provide network services, such as Internet access, through the NCS or a portion of the NCS.

In one embodiment, a user, may access the NCS through a computing device using, for example, a wireless (or wired) network interface card. When in sufficiently close range to an access point, the computing device may wirelessly access the NCS, or the computing device may be directly connected to a wired connection. A user of the computing device may input an access code through an input device of the computing device. In an alternate embodiment, a distribution unit may input the access code through an input of the computing device. The computing device provides the access code to the NCS. A component of the NCS receives the access code and access and/or services of the network may be provided to the computing device dependent on a validity of the access code and various attributes which may be associated with the access code.

BRIEF DESCRIPTION OF THE DRAWINGS

Other objects and advantages of the invention will become apparent upon reading the following detailed description and upon reference to the accompanying drawings in which.

Figure 1:
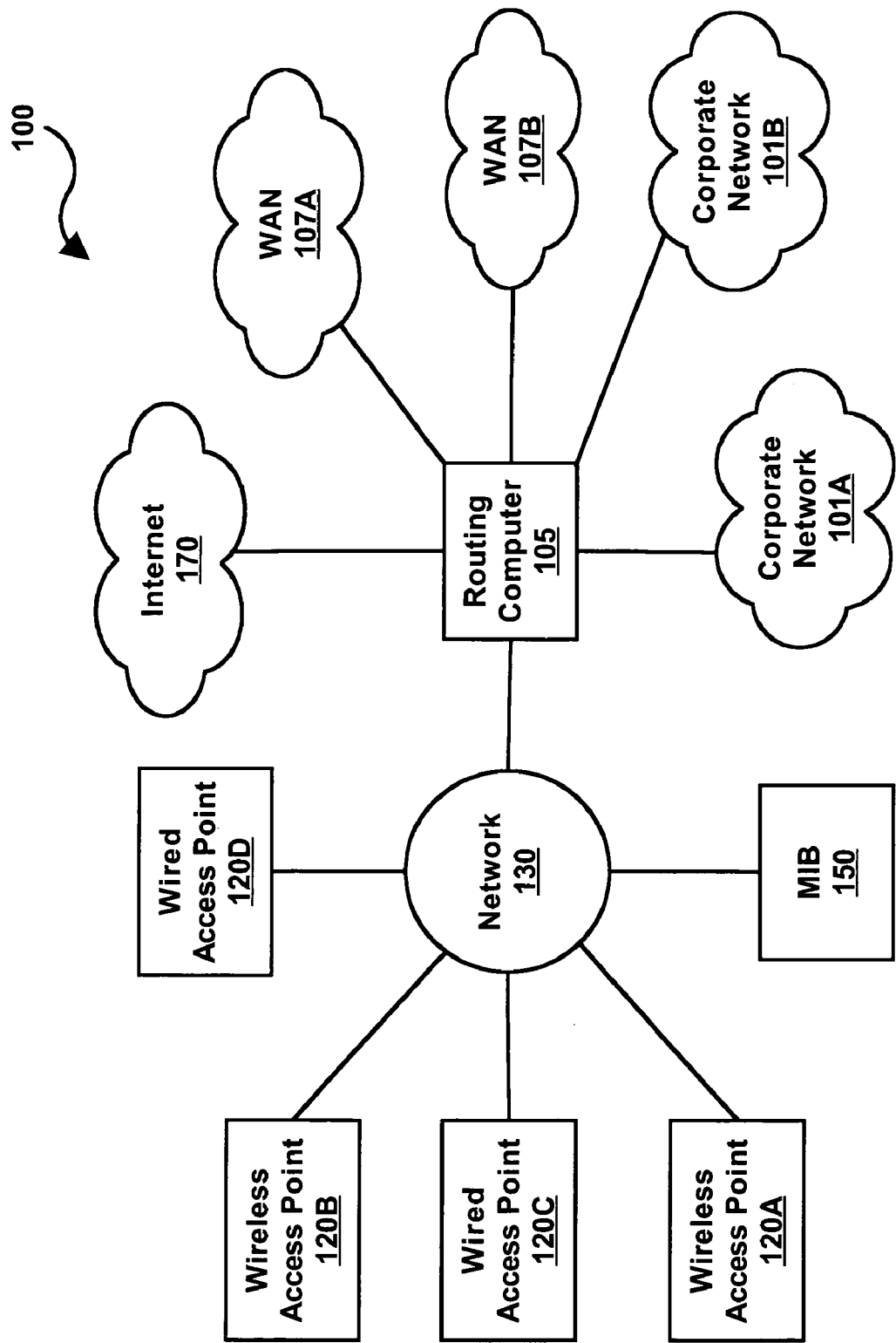
FIG. 1 is a block diagram of one embodiment of a network communications system according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

PRIORITY CLAIM

This application claims benefit of priority of provisional application Ser. No. 60/454,212 titled "CHIT CODE SYSTEM OF AUTHENICATION AND ACCESS CONTROL" filed on Mar. 11, 2003, whose inventors are Ian M. Fink and James D. Keeler.

DETAILED DESCRIPTION

Incorporation by Reference

U.S. Pat. No. 5,835,061, titled "Method and Apparatus for Geographic-Based Communications Service", whose inventor is Brett B. Stewart, is hereby incorporated by reference in its entirety as though fully and completely set forth herein.

U.S. Pat. No. 5,969,678, titled "System for Hybrid Wired and Wireless Geographic-Based Communications Service", whose inventor is Brett B. Stewart, is hereby incorporated by reference in its entirety as though fully and completely set forth herein.

U.S. patent application Ser. No. 09/433,817 titled "Geographic Based Communications Service" and filed on Nov. 3, 1999, whose inventors are Brett B. Stewart and James Thompson, is hereby incorporated by reference in its entirety as though fully and completely set forth herein.

U.S. patent application Ser. No. 09/433,818 titled "A Network Communications Service with an Improved Subscriber Model Using Digital Certificates" and filed on Nov. 3, 1999, whose inventors are Brett B. Stewart and James Thompson, is hereby incorporated by reference in its entirety as though fully and completely set forth herein.

U.S. patent application Ser. No. 09/551,309 titled "System and Method for Managing User Demographic Information Using Digital Certificates" and filed on Apr. 18, 2000, whose inventors are Brett B. Stewart and James Thompson, is hereby incorporated by reference in its entirety as though filly and completely set forth herein.

U.S. patent application Ser. No. 09/767,374 titled "Distributed network communication system which allows multiple wireless service providers to share a common network infrastructure" and filed on Jan. 22, 2001, whose inventors are James Thompson, Kathleen E. McClelland, and Brett B Stewart, is hereby incorporated by reference in its entirety as though fully and completely set forth herein.

U.S. Provisional Patent Application Serial No. 60/383,827 titled "Roaming" AND filed on May 29, 2002, whose inventors are James D. Keeler and Matthew M. Krenzer, is hereby incorporated by reference in its entirety as though fully and completely set forth herein.

U.S. patent application Ser. No. 10/341,761 titled "AUTHORIZATION AND AUTHENTICATION OF USER ACCESS TO A DISTRIBUTED NETWORK COMMUNICATION SYSTEM WITH ROAMING FEATURES" and filed on Jan. 14, 2003, whose inventors are James D. Keeler and Matthew M. Krenzer, is hereby incorporated by reference in its entirety as though fully and completely set forth herein.

U.S. patent application Ser. No. 10/387,337 titled "SYSTEM AND METHOD FOR USER ACCESS TO A DISTRIBUTED NETWORK COMMUNICATION SYSTEM USING PERSISTENT IDENTIFICATION OF SUBSCRIBERS" and filed on Mar. 11, 2003, whose inventors are James D. Keeler, Ian M. Fink, and Matthew M. Krenzer, is hereby incorporated by reference in its entirety as though fully and completely set forth herein.

One embodiment of the present invention is directed to an authorization and access control system for a venue or a geographic region comprising a plurality of venues. The authorization and access control system provides one or more computing devices selective access to one or more networks and/or services available in a network communications system by distributing a substantially unique string of characters (an "access code") to each user of a computing device. The access code can then be entered via an input device, such as a keyboard or its equivalent, of the computing device. This enables the computing device to gain access to one or more networks and/or services at a venue or geographic region with the network communications system. The authorization and access control system is useful and may have several advantages in several venues, with a network communications system, such as coffee shops, hotels, truck stops, fueling stations, train stations, law offices, marinas, restaurants, and stores, among others. Various embodiments are also useful and may be advantageous in a geographic region comprising a plurality of possible venues.

FIG. 1—A Network Communications System

FIG. 1 shows one embodiment of a distributed network communication system (NCS) 100. NCS 100 may include one or more access points (APs) 120A-D. The wireless access points 120A-B communicate with a computing device 110 in a wireless fashion, while the wired access points 120C-D communicate with computing device 110 in a wired fashion. Each wireless access point (AP) may have a wireless connection or transceiver and may operate according to various wireless standards, such as wireless Ethernet (IEEE 802.11), IEEE 802.16, Bluetooth, and/or General Packet Radio Service (GPRS), among others.

Each of the access points 120A-D may be coupled to a network 130. The network 130 may comprise a wired network, a wireless network or a combination of wired and wireless networks. For example, the network 130 may be a standard "wired" Ethernet network which may connect each of the wireless access points 120A-B and wired access points 120C-D together. Network 130 may include one or more wireless networks based on IEEE 802.11 and/or IEEE 802.16. For instance, one or more wireless APs 120A-B may be coupled to network 130 in a wireless fashion. Network 130 may include one or more DSL (digital subscriber line) and or cable (e.g., cable television) networks and/or infrastructures. For example, network 130 may include one or more of: cable modems, cable modem termination systems (CMTSs), DSL modems, digital subscriber line access multiplexers (DSLAMs), broadband remote access servers (BRASs), and/or metropolitan area networks (MANs), among others. The network 130 may form part of the Internet, or may couple to other networks, e.g., other local or wide area networks, such as the Internet 170.

Network 130 may be coupled to other types of communications networks, (e.g., other than the Internet) such as the public switched telephone network (PSTN), where user 115 using computing device 110 may send and receive information from/to the PSTN or other communication networks. Network 130 may also be coupled to a wide area network (WAN) 107B, such as a proprietary WAN. Network 130 thus may be, or be coupled to, any of various wide area networks (WANs) 107A-B, local area networks (LANs), corporate networks 101A-B, including the Internet 170. Network 130 may be coupled to a routing computer 105 where routing computer 105 provides authentication and access control from one or more computing devices 110 coupled to network 130 or coupled to one of the access points 120A-D to the various WANs 107A-B, local area networks (LANs), and corporate networks 10A-B, including the Internet 170. In one embodiment, routing computer 105 may be a broadband remote access server (BRAS).

Access to these networks comprises any "services" these networks may provide. These services may comprise: email, world wide web, file transfer, printing, file sharing, file system sharing, remote file system, network file system (NFS), news, multicast, netbios, encryption, domain name service (DNS), routing, tunneling, chat such as Internet Remote Chat or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN)

(e.g., IEEE 802.1q), virtual private network or VPN, audio, phone, Voice Over Internet Protocol (VoIP), paging, or video, among others.

Moreover, routing computer 105 comprised in NCS 100 may be a computer system operable to comprise management information base (MIB) 150, network 130, one or more wireless access points 120A-B, and/or one or more wired access points 120C-D.

User 115 operating computing device 110 may communicate with one of the wireless APs 120A-D to gain access to a network and its services, such as Internet 170. Computing device 110 may have a wireless communication device, e.g., a wireless Ethernet card, for communicating with one or more of the wireless APs 120A-B. Computing device 110 may instead have a wired communication device, e.g., an Ethernet card, for communicating with one or more of the wired APs 120C-D.

The computing device 110 may be any of various types of devices, including a computer system, such as a portable computer, a personal digital assistant (PDA), an Internet appliance, a communications device, or other wired or wireless device. Computing device 110 may include various wireless or wired communication devices, such as a wireless Ethernet card, paging logic, RF (radio frequency) communication logic, a wired Ethernet card, a modem, a DSL device, an ISDN device, an ATM (asynchronous transfer mode) device, a parallel or serial port bus interface, or other type of communication device.

In one embodiment, computing device 110 includes a memory medium which stores identification information. The identification information may be a System ID (an IEEE 802.11 System ID), a Media Access Control (MAC) ID of a wireless or wired Ethernet device comprised in the computing device 110, or other type of information that uniquely identifies the computing device 110. The identification information may be contained in a digital certificate, which may be stored in a web browser, in a client software, or in a memory medium of computing device 110.

With wireless APs 120A-B, the wireless communication may be accomplished in a number of ways. In one embodiment, computing device 110 and wireless APs 120A-B are equipped with appropriate transmitters and receivers compatible in power and frequency range (e.g., 900 MHz, 2.4 GHz, 5 GHz, etc.) to establish a wireless communication link. Wireless communication may also be accomplished through cellular, digital, or infrared communication technologies, among others. To provide user identification and/or ensure security, computing device 110 may use any of various security mechanisms.

With wired APs 120C-D, the wired connection may be accomplished through a variety of different ports, connectors, and transmission mediums. For example, the computing device 110 may be connected through an Ethernet, USB, FireWire (IEEE 1394) serial, or parallel transmission cables, among others. Computing device 110 may also include various communication devices for connecting to one of the wired APs 120C-D, such as wired Ethernet cards, modems, DSL adapters, ATM adapters, IDSN devices, or other communication devices. For example, a hotel may have Ethernet connections in the restaurants, shops, meeting rooms, and guest rooms. An airline club, e.g., an airport Admiral's Club, may also have both wireless and wired connections for mobile users. A user may connect to a wired AP 120C through the use of a laptop computer (computing device 110), an Ethernet network card, and a network cable. This connection may have the same impact as a connection made to a wireless AP 120A as discussed above. In other words, a user using a wired computing device 110 is able to use various network infrastructures in the same manner as a user using a wireless computing device 110.

NCS 100 may also include a management information base (MIB) 150. The MIB 150 may be a mechanism, such as a memory, which may allow the persistent storage and management of information needed by network 130 to operate. For example, in one embodiment of the invention, the MIB 150 may store a data structure, such as a table comprising a list of identification information and a corresponding list of the plurality of possible networks and/or services. The data structure may also store access information, which may comprise associated methods for providing data to the respective plurality of possible networks and/or services. The access information may further comprise access level and/or privilege level information. Thus, the data structure may comprise a table having a plurality of tuples, with each tuple having the identification information. In an alternate embodiment, as noted above, the data structures which store this information may be comprised in each of the access points 120A-D, or may be provided in various other locations.

MIB 150 may store other information, such as a directory of all the elements (e.g., access points, computing devices, etc) in the network, the topology of the network, characteristics of individual network elements, characteristics of connection links, performance and trend statistics, and any information which is of interest in the operation of network 130. For example, the MIB may store the precise longitude, latitude, altitude and other geographic information pinpointing the location of each access point.

NCS 100 may be geographic-based. In other words, the NCS 100 may provide information and/or services to the user based at least partly on the known geographic location of the computing device 110, e.g., as indicated by APs 120A-D or as indicated by geographic information (e.g., GPS information) provided from computing device 110. In one embodiment, APs 120A-D are arranged at known geographic locations and may provide geographic location information regarding the geographic location of the user or computing device 110. In another embodiment, computing device 110 may provide geographic location information of the computing device 110 through an AP to network 130. For example, the computing device 110 may include GPS (Global Positioning System) equipment to enable computing device 110 to provide its geographic location through the AP to network 130.

Figure 1A:
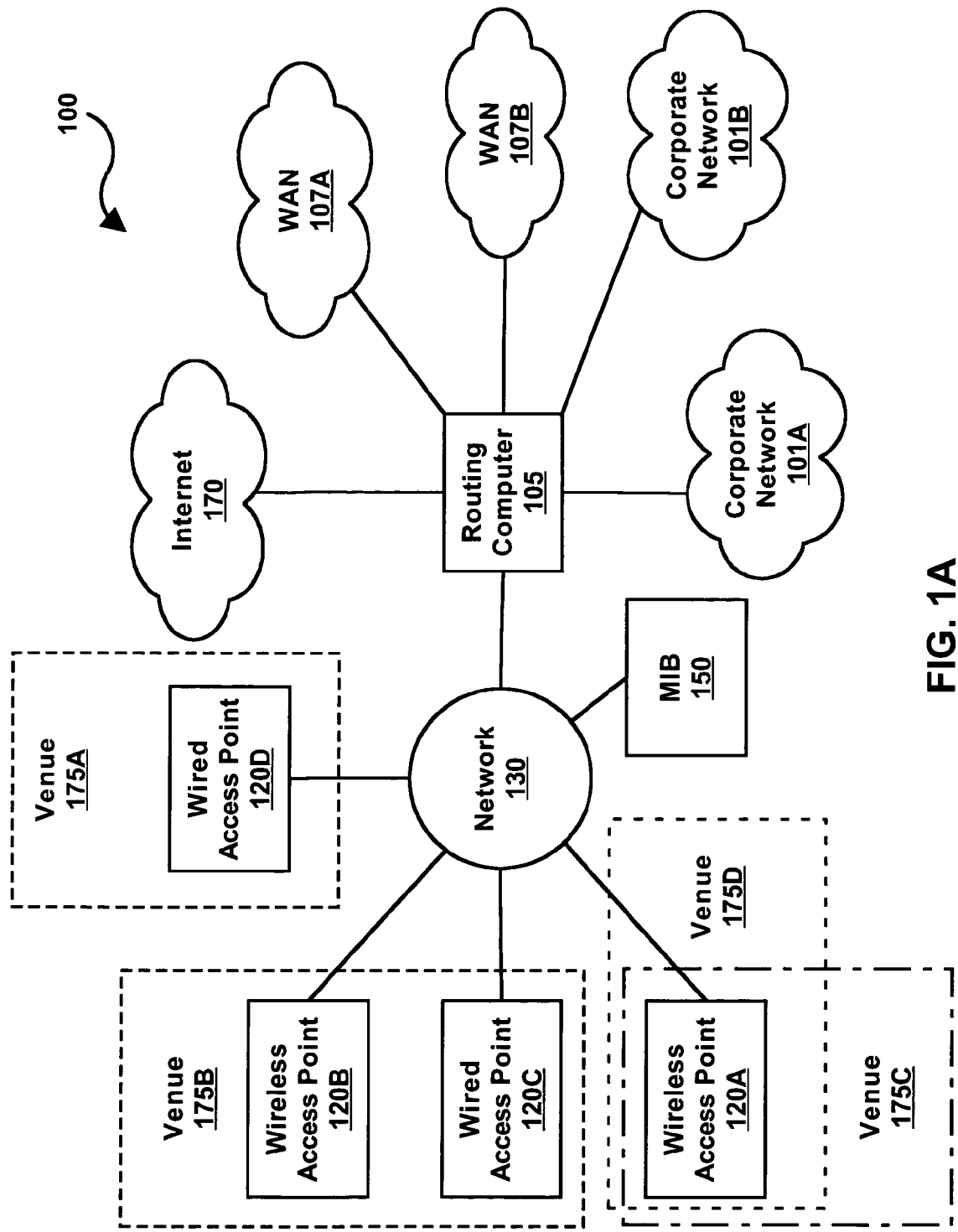
FIG. 1A is a block diagram of one embodiment of a network communications system according to one embodiment.

In one embodiment, NCS 100 may service a single venue. In another embodiment, NCS may service a plurality of venues 175A-D, as shown in FIG. 1A. For instance, each of the venues 175A-D may comprise a portion of NCS 100. In another embodiment, a plurality of venues, such as venues 175C-D, may comprise a physical portion of NCS where the physical portion is common to both venues but may appear as more than one portion in a virtual fashion with the use of virtual access points as further described below.

Memory Medium and Carrier Medium

One or more of the systems described above, such as computing device 110, APs 120A-D, MIB 150, and routing computer 105 may include a memory medium on which computer programs or data according to the present invention may be stored. For example, each of the APs 120A-D and/or MIB 150 may store a data structure as described above comprising information regarding identification information, corresponding networks, and access information such as associated data routing methods. Each of the APs 120A-D and/or MIB 150 may further store a software program for accessing these data structures and using the information therein to properly provide or route data between personal computing devices and networks, or to selectively provide or route data depending on the access information.

The term "memory medium" is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. The memory medium may also be a distributed memory medium, e.g., for security reasons, where a portion of the data is stored on one memory medium and the remaining portion of the data may be stored on a different memory medium. Also, the memory medium may be one of the networks to which the current network is coupled, e.g., a SAN (Storage Area Network).

Also, each of the systems described above may take various forms, including a personal computer system, mainframe computer system, workstation, network appliance, Internet appliance, personal digital assistant (PDA), an embedded computer system, television system or other device. In general, the term "computer system" can be broadly defined to encompass any device having a processor which executes instructions from a memory medium.

The memory medium in one or more of the above systems thus may store a software program or data for performing or enabling access or selective network access. A CPU or processing unit in one or more of the above systems executing code and data from a memory medium comprises a means for executing the software program according to the methods or flowcharts described below.

Various embodiments further include receiving or storing instructions and/or data implemented in accordance with the present description upon a carrier medium. Suitable carrier media include memory media as described above, as well as signals such as electrical, electromagnetic, or other forms of analog or digital signals, conveyed via a communication medium such as networks and/or a wireless link.

Virtual Access Points

One or more of the wireless APs 120A-B, routing computer 105, and/or MIB 150 may include software that enables APs 120A-B to accommodate or service users of a plurality of different venues. Thus, an AP 120A may be operable to appear as any one of a plurality of different venue APs, meaning that a single wireless AP may "pretend to be" or behave as an access point dedicated to a particular venue for each of a plurality of different venues. In other words, according to one embodiment of the invention, wireless AP 120A may execute one or more software programs that allow it to act as an AP for each of the plurality of venues. These venues may include venues 175C-D shown in FIG. 1A. Thus, AP 120A may be capable of broadcasting and/or recognizing any of a plurality of system identifications (SIDS) and maintaining associations between the SIDS and the users of the respective venues. The identification information may be a System ID (an IEEE 802.11 System ID), a MAC ID of a wireless Ethernet device comprised in the computing device 110, the name of the venue, or other type of information that uniquely identifies one (or more) venue providing network access. Where the wireless network is IEEE 802.11 wireless Ethernet, the identification information or System ID may be a SSID (Service Set ID), an ESSID (Extended Service Set ID) or possibly a BSSID (Basic Service Set ID).

In one embodiment, NCS 100 services a geographic region. For example, a geographic region may be an airport comprising a possible plurality of venues such as Mc Donald's, Burger King, Subway, Starbucks, etc. With NCS 100, each of the possible plurality of venues may have its own virtual access point provided by a physical access point such as wireless AP 120A, as shown in FIG. 1A. Additionally, each virtual access point may use a different wireless communications channel from another, as described further below. Moreover, a first venue of the possible venues may have a plurality of access codes that will work with the first venue's virtual access point and not work with a second venue's virtual access point. One or more of these possible venues may charge a fee for access codes that provide access to a network comprised in NCS 100. Additionally, one or more of these possible venues may distribute access codes without charge, for access to a network comprised in NCS 100, as an amenity for patronage of a venue.

FIGS. 2-5—Distribution of Access Codes

Access code 210 may be created within a few moments of a venue associate 200 distributing access code 210 to user 115. A printer coupled to network 130 or coupled a computer system may be used to print out access code 210, according to one embodiment. The computer system may create access code 210 on demand, or it may have created access code 210 and stored it in a memory medium or in a database of the computer system. Various attributes of access code 210 may be stored in a data structure along with access code 210. In other embodiments, access codes may be created by a computer system coupled to a network comprised in NCS 100. For example, routing computer 105 may create access codes and store the access codes in a memory medium or in a database coupled to routing computer 105. For instance, the database may be MIB 150. In another example, access codes may be available through an authorization server such as an AAA (authentication, authorization, and accounting) server. In various other embodiments, access codes may be created and stored in various components of NCS 100. In one embodiment, access codes may be created and/or stored in a distribution unit 212. In another embodiment, a roaming partner or ally 178 may create and store access codes for distribution to its subscribers.

Figure 2:
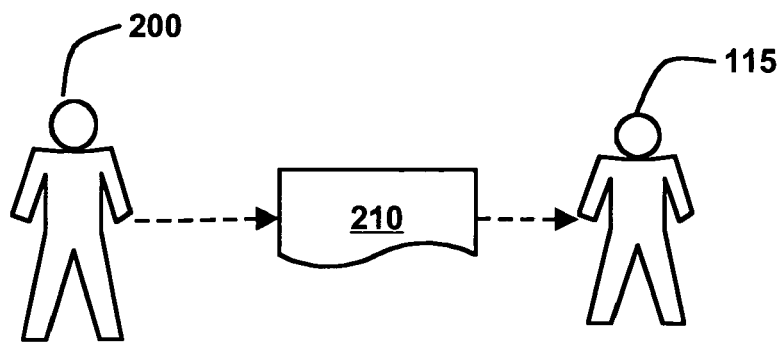
FIG. 2 is a diagram of one embodiment of a distribution of an access code according to one embodiment.

One advantage to the access code system may be to ensure that user 115, wishing access of one or more networks comprised in NCS 100 at a venue, has purchased a product from the venue by a person-to-person distribution of an access code 210 to user 115. This is depicted in FIG. 2 by a person-to-person distribution of access code 210 by venue associate 200 to user 115. In this depiction, venue associate 200 is a natural person.

Figure 3:
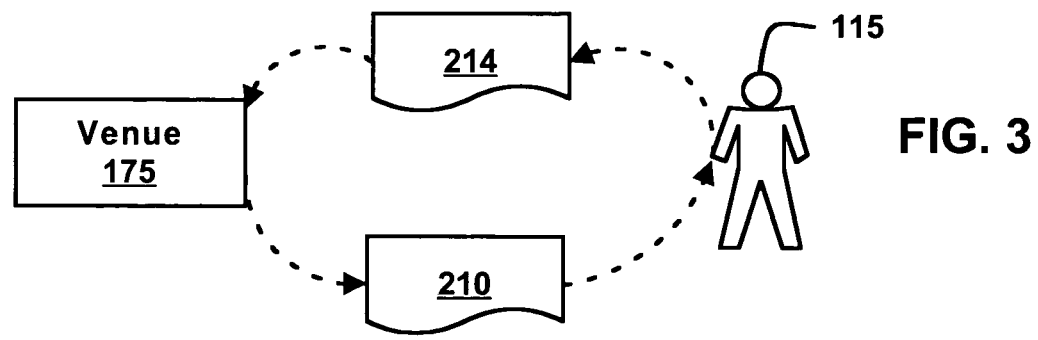
FIG. 3 is a diagram of one embodiment of a distribution of an access code according to one embodiment.

This may be useful if the venue offers access to one or more networks, comprised in NCS 100, as an amenity for patronage to the venue. The venue may also charge for access to one or more networks comprised in communication network system 100 by selling access codes. For example, FIG. 3 depicts user 115 issuing a venue 175 a compensation 214 (e.g., money) for other goods or services of venue 175 or access code 210, and venue 175 issues access code 210 to user 115.

Another benefit may be a facilitation of collection of monies from user 115 accessing one or more networks comprised in NCS 100. By this, a venue need not have a revenue collection system based on the use of an online credit card billing system and all the complexities and costs associated with such a system. Venue associate 200 may directly collect revenue from user 115 with the access code system, while leveraging existing revenue collection means such as cash registers, credit card "swiper", etc.

Figure 4:
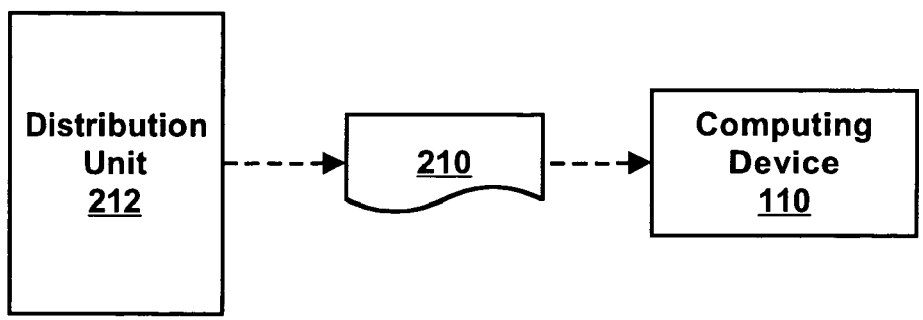
FIG. 4 is a diagram of one embodiment of a distribution of an access code according to one embodiment.
Figure 5:
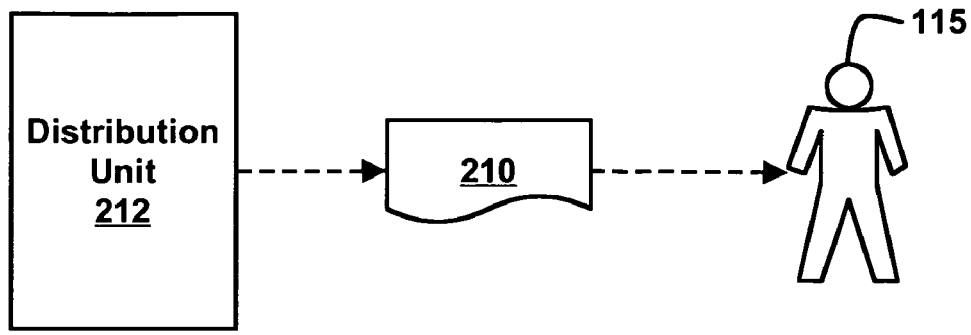
FIG. 5 is a diagram of one embodiment of a distribution of an access code according to one embodiment.

In another embodiment, a venue may have an automated means to distribute access codes. FIG. 4 depicts user 115 receiving an access code 210 from a distribution unit 212. Distribution unit may be automated. In one embodiment the venue may provide distribution unit 212 which may be a vending machine to distribute and/or sell access codes. In an alternate embodiment, distribution unit 212 may include a display or audio system operable to distribute access codes. In an alternate embodiment, distribution unit 212 may distribute access code 210 to an input of computing device 110, as shown in FIG. 5.

In another example, a venue such as a hotel may comprise NCS 100, may desire to have control or provide a more personable interaction with its guests. For instance, the hotel may benefit from knowledge of a room in which the guest is using computing device 110 coupled to one of the APs 120A-D to access one or more networks comprised in NCS 100. User 115 may call the front desk or an automated menu system for access of one or more networks comprised in NCS 100. The hotelier may identify a room number from a phone system and may charge the room of user 115 for the access by his or her computing device 110. The hotelier may verbally distribute an access code 210 to user 115, over the phone system. Alternatively, the hotelier may fax an access code 210 to the room or have access code 210 displayed upon another device in the room, of the originating phone call. Alternatively, access code 210 may be automatically communicated in a wired or wireless fashion to the computing device 110 of the user. Distribution unit 212 may provide this functionality. This may also reduce the complexity of identifying the position or geographic location of user 115 by a means of one or more alternative methods with the plurality of APs 120A-D. Additionally, in a venue such as a hotel, a plurality of access codes 210 may be distributed and accounted for, as analogous to the way beverages are in the mini-bar of each guest room.

An access code 210 may be associated with one or more attributes including: a certain time time-frame of use such as between certain hours of the day; a duration of use such as only for two hours after its use; expiration time such as a time in the future, after the access code is created; an active or inactive status; a single venue of use such as it may only be used at the Mozart's Café in Austin, Tex.; a plurality of venues of use such as comprising all Starbucks coffee shops, comprising the Starbucks located in a geographic location like New York, N.Y., or comprising the Starbucks locations in the Barnes and Noble book stores; access to one or more specific networks comprised in NCS 100; a use of only certain services of one or more networks comprised in NCS 100, such as the services mentioned above; or a quality of service (QoS) (e.g., IEEE 802.1p) such as a certain bandwidth characteristic of a limit of 128 kilobits per second (kbps) for uploading data and 512 kbps for downloading data.

Associated access code attributes may be useful in several venues. For example, user 115 may visit a venue such as a law office comprising NCS 100 or a portion of NCS 100. User 115 may be given an access code 210 to access the Internet 170. Associated attributes of access code 210 may direct routing computer 105 to allow computing device 110 access of the Internet 270 but not to a corporate network 10A. One or more associated attributes of the access code may only allow the access code to be valid between the hours of 7:00 AM to 6:00 PM local time, will only grant access to the Internet 170 for three hours after its use, and is only valid at that specific law office and not a second law office possessing a second NCS 100 or a second portion of NCS 100, in different geographic region that may be associated with the first law office.

In another example, it may be determined that user 115 requires or desires access to the corporate network 101A comprised in the first NCS 100. User 115 may receive a second access code 210 with one or more associated attributes to enable computing device 110 access of the corporate network 101A comprised in the first NCS 100 for a period of one hour after the use of the second access code 210.

Additionally, at a venue with NCS 100, a first access code 210 may allow access, by a computing device 110, of a first network comprised in NCS 100. With a use of a second access code 210, access of the first network may be modified. For example, use of the first access code 210 allows access of the Internet 170, by computing device 110. Use of the second access code 210 may allow access of a corporate network 101A, by computing device 110, while access of the Internet 170 may be revoked. As another example, use of the first access code 210 allows access of the Internet 170, to computing device 110, with a QoS of 128 kbps for uploading data and 512 kbps for downloading data. Use of the second access code may modify access of the Internet 170, allowing the QoS by computing device 110 to 512 kbps for uploading data and 784 kbps for downloading data. As a third example, the services, of a network, provided to computing device 110 may be modified. For instance, the use of the first access code may only allow a service of the world wide web to computing device 110. With use of the second access code, the computing device 110 may have an added service of email, as well.

Figure 6:
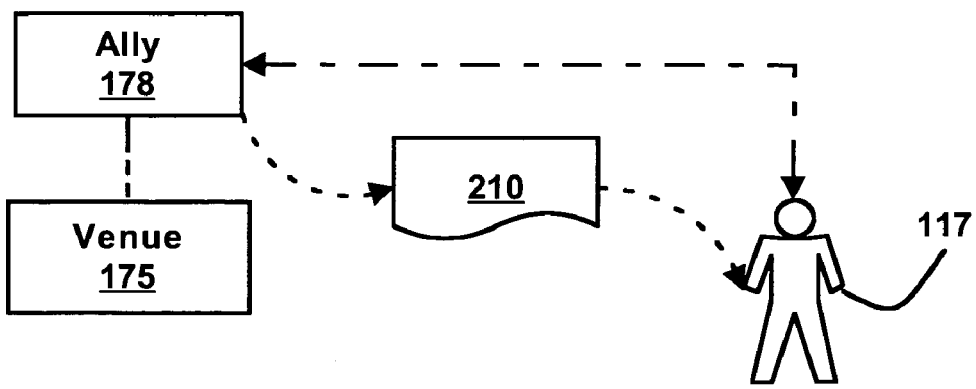
FIG. 6 is a diagram of one embodiment of a distribution of an access code from an ally according to one embodiment.
Figure 7:
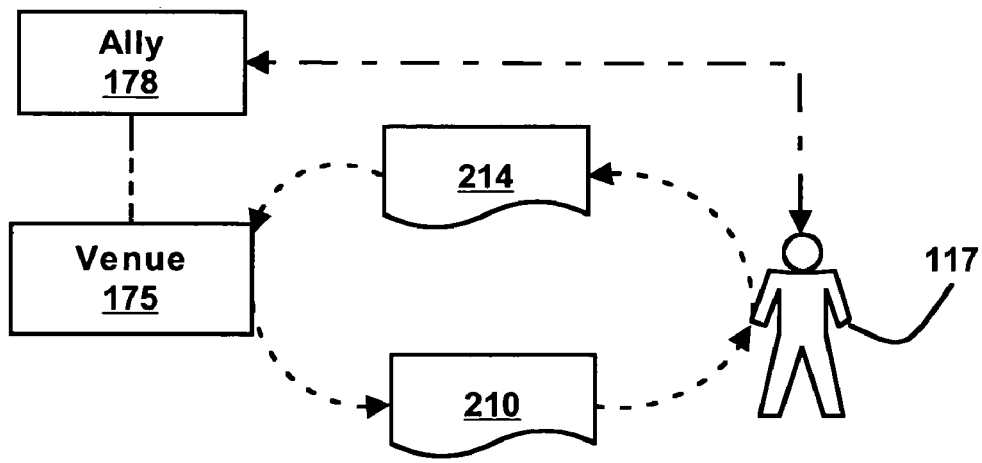
FIG. 7 is a diagram of one embodiment of a distribution of an access code according to one embodiment.

FIGS. 6-7—Roaming or Ally Relationship

A venue 175 or geographic region, with a NCS 100, may have a roaming agreement or contractual relationship with a "roaming partner" or "ally" 178 such as an Internet Service Provider (ISP), a telecommunications carrier (e.g., Southwestern Bell, Bell South, etc.), a cellular phone carrier, etc. (The owner or operator of the NCS 100 has an agreement or contractual relationship to provide network access to a plurality of subscribers 117 of a roaming partner or ally. Generally speaking, the owner or operator may have no prior arrangement with a subscriber 117 of the roaming partner or ally.) In one embodiment, subscriber 117 may receive access code 210 directly from roaming partner or ally 178, as shown in FIG. 6. Subscriber 117 who may be a subscriber of a roaming partner may call a phone number of the roaming partner, input an identification and/or an authorization, and receive an access code. For example, subscriber 117 is at venue and subscribes to AT&T Wireless Service (ATTWS) for his or her cellular phone service. Venue 175 has a roaming agreement with ATTWS which allows a plurality of subscribers of ATTWS access to one or more networks comprised in NCS 100 with the use of an access code from ATTWS. Subscriber 117 may use his or her cellular phone to access an access code distribution system of ATTWS. This system may be automated and/or comprise one or more natural persons. The identification of subscriber 117 may be the user's cellular phone number, an electronic serial number (ESN), or some other means of Caller identification. The authentication of subscriber 117 to ATTWS may be a password or a Personal Identification Number (PIN). The PIN may simply be the user's PIN for access to his or her voice mail. For example, subscriber 117 calls a phone number (e.g., "555-867-5309", etc.) or a service number (e.g., "*426", etc.) from his or her ATTWS cellular phone. ATTWS identifies the cellular phone by an identification means, and the user inputs a PIN used for authentication. Subscriber 117 may receive an access code in an audible fashion through the cellular phone, may receive a text message, or may receive the access code directly on a display of the cellular phone.

An owner or operator of NCS 100 of the geographic region may charge the roaming partner or ally 178 an access fee for use or uses of one or more networks comprised NCS 100, or there may be no fee. Venue 175 may even pay the roaming partner or ally 178 a fee for use or uses of one or more networks comprised in NCS 100 by subscriber 117, since the roaming partner or ally 178 may have directed subscriber 117 as a patron to venue 175 or geographic region.

Figure 8:
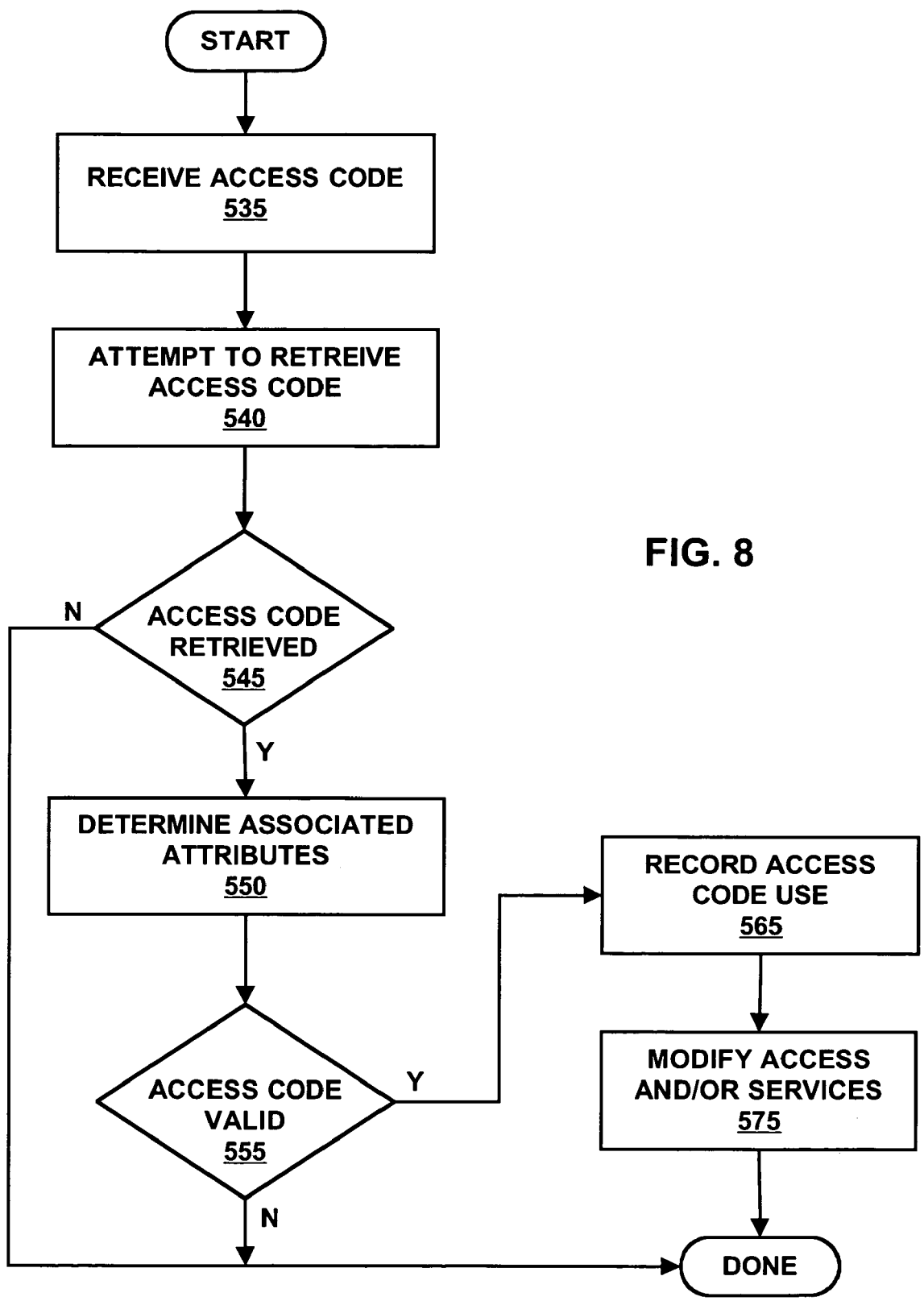
FIG. 8 is a flowchart of a method for a computer system providing authorization and access of a computing device to one or more networks according to one embodiment.
Figure 9:
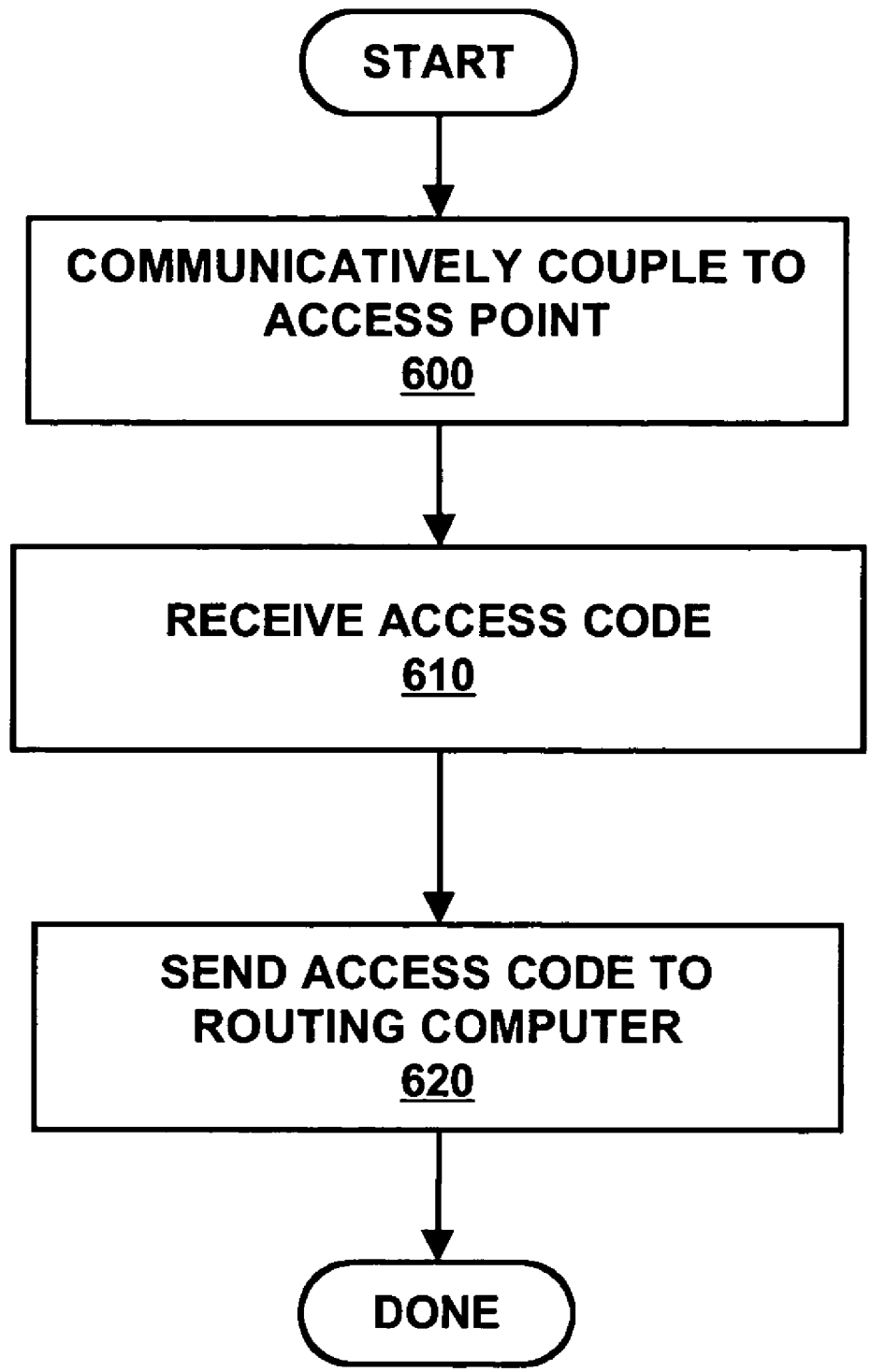
FIG. 9 is a flowchart of a method for a coupling to a network comprised in a network communications system according to one embodiment.

FIGS. 8-9—Methods for Providing Network Access

FIG. 8 is a flowchart depicting a computer-implemented method that may be used on a computer system comprised in NCS 100. The method starts and proceeds to block 535, where an access code 210 is received. The method next proceeds to block 540, where an attempt may be made to retrieve access code 210 from a memory medium used for storing access code information. In another embodiment, an attempt may made be to retrieve access code 210 from a database that may be stored locally or may be available through a network comprised in NCS 100.

Next, at block 545, it may be determined if the access code was retrieved. If not, the method completes. If so, the method proceeds to block 550.

At block 550, possible attributes associated with access code 210 may be determined. As above, access code 210 may be associated with one or more attributes. The method then proceeds to block 555 where a validity of access code 210 may be determined. If the access code has been previously used for an access modification, it may not be valid. The validity of the access code may be determined from its associated attributes. Some examples are as follows.

If the expiration time attribute of an access code has passed, the access code may not be valid. If a time-frame of use attribute of an access code is incorrect (its attempted use occurs at 7:00 AM while the time-frame of validity is from 8:00 AM to 6:00 PM), then the access code may not be valid (until its use during the specific time-frame during the hours of 8:00 AM to 6:00 PM).

Access code 210 may have an attribute of only being valid on a first AP of the APs 120A-D and not on a second AP of the APs 120A-D; thus, if the access code is attempted to be used on the second AP, it may not be valid.

Access code 210 may associate with an attribute specifying a geographic location of validity or a plurality of geographic locations of validity. In one embodiment, a geographic region of validity may be compared against a known geographic location of computing device 110. In another embodiment, a geographic region of validity may be compared against a known geographic location of an access point communicating with computing device 110. Moreover, a geographic location may be of any size. For example, an access code may only be valid at Starbucks coffee shops in New York, N.Y., and if used outside these areas, access code 210 may not be valid. Further, a geographic location may comprise an area or a plurality of areas within a geographic region itself. For a second example, a geographic region such as a hotel with NCS 100 access code 210 may only be valid in a public area or a plurality of public areas of the hotel but not valid in one or more guest rooms or may not be valid in one or more meeting/ball rooms of the hotel. Moreover, access code 210 may be valid in one or more public areas but not in a bar of the hotel. As above, a geographic region may comprise any area of any size, including parks, portions of airports, areas of a town, cities, states, among others.

If the access code is determined to be not valid for one or more reasons, the method completes. If the access code is valid, the system proceeds to block 565.

At block 565, routing computer 105 may record the use of access code 210. This recording, of access code 210 use, may occur in a memory medium or in a database. In recording the use of the access code, one or more attributes associated with the access code may be adjusted. For instance, an attribute associated with access code 210 may have its status changed from active to inactive. Access code 210 may be associated with a use-specific attribute or flag that may be set to indicate access code 210 as having been used.

In another embodiment, a Secure Socket Layer (SSL) connection, or other methods of encryption, may be not necessary in NCS 100, since an access code 210 may be of one-time-use. Access code 210 may no longer useful or valid, once it is used for allowing access and/or service modification of a computing device 110 to one or more networks comprised in NCS 100. Thus, it may not matter if access code 210 is obtained from unethical or nefarious means by a second computing device 110 comprised in NCS 100. The method then proceeds to block 575.

As block 575 shows, access of one or more networks and/or services of one or more networks by computing device 110 may be modified. The modification may grant and/or revoke access and/or services of one or more networks. For instance, one or more services of one or more networks of NCS 100, as noted above, may be granted and/or revoked. Furthermore, the QoS of access and/or service of one or more networks may be modified, as well. In one embodiment, one or more access points are at known locations in a geographic region, access and/or service modification may be based on the geographic location of computing device 110. In another embodiment, one or more access points are at known locations in a geographic region, access and/or service modification may be based on the geographic location of an access point communicating with computing device 110.

FIG. 9 is a flowchart depicting a computer-implemented method that may be used on computing device 110. The method starts and proceeds to block 600, where computing device 110 may communicatively couple to an AP of the APs 120A-D. The method next proceeds to block 610, where computing device 110 receives an access code 210 through an input device of computing device 110. The input device may be a keyboard or may be similar such as a key board displayed on the screen of the computing device 110, where user 115 uses a pointing device such as a stylus or mouse. The input device may be of other forms as well. For example, these forms may include an input port for inputting information into computing device 110 such as a USB port, a serial port, a parallel port, a smart card port, a flash memory port, an Ethernet port, or a SIM card port, among others. Computing device may also receive access code 210 through a wireless means. For example, distribution unit 212 may be operable to distribute access codes in a wireless fashion to computing devices 110 that are proximate to distribution unit 212. Next, at block 620 access code 210 may be sent to a computer system, e.g., routing computer 105, of NCS 100 that provides access and/or services of one or more networks comprised in NCS 100.

Wireless Access Point Usage of Multiple Channels

A wireless AP of APs 120A-B can concurrently use one of a plurality of different RF (radio frequency) channels for communication with computing devices of users. For example, wireless AP can use one of RF channels 1 through 11. As is well known, RF channels 1, 6 and 11 are non-overlapping, with the remainder of these channels being partially overlapping with other channels. In another example, wireless AP may use one or more channels in a first frequency band such as 2.4 GHz and concurrently use one or more channels in a second frequency band such as 5 GHz. In one embodiment, channels in one frequency band may provide more bandwidth than channels in another frequency band. The term "frequency band" may be used to describe any range of contiguous radio frequencies.

According to one embodiment of the present invention, each wireless AP can communicate on one or more, e.g. a plurality of or all of, the available wireless channels, e.g., the available RF channels. Furthermore, each of the AP 120A-B can control which channel computing device 110 of a client is able to use. In one embodiment, each computing device may scan each of the RF channels until it detects a wireless AP at one of the channels.

In one embodiment, one or more of the wireless APs 120A-B may each utilize a plurality of the RF channels, e.g., may use each of the non-overlapping channels 1, 6 and 11 to effectively provide up to three times the channel capacity. Thus, one or more of the AP 120A-B may be able to control allocations of a plurality or all of the respective RF channels to selectively obtain higher bandwidth when appropriate, or to simply accommodate a greater number of computing devices 110. Thus, if wireless AP 120A using only one RF channel could only handle fifty computing devices 110 on that respective channel, the wireless AP 120A may operate to use three non-overlapping RF channels to effectively triple this capacity to a total of 150 concurrent or simultaneous computing devices 110.

As another example, if wireless AP 120A is only communicating with one computing device 110, then the wireless AP 120A may optionally or selectively use three non-overlapping RF channels to produce effectively three times the bandwidth for this communication. As additional computer devices come into communication with the wireless AP 120A, wireless AP 120A may selectively allocate different channels to different ones of these computing devices as needed. Further, if more than three computing devices are communicating with wireless AP 120A, AP 120A may partition one or more of the respective channels for the respective users, such as using wireless Ethernet Collision Sense Multiple Access/Collision Detection (CSMA/CD) or other multiple access schemes such as TDMA, FDMA, or CDMA, among others.

In one embodiment, as described above with respect to block 575, a wireless AP of the wireless APs 120A-B operates to direct a computing device 110 to an available channel, possibly based on one or more attributes associated with the access code received from the computing device 110. Thus the wireless AP, not the computing device, may assign channels for communication. For example, wireless AP 120B may operate to direct a computing device 110 to an available communication channel (e.g., an RF channel) based on the identification information, e.g., the System ID, received from the computing device 110. The wireless AP 120B may also operate to direct the computing device 110 to an available communication channel based on other types of identification or authentication information, or on the determined access of the computing device. This allows wireless AP 120B to separate the communication traffic onto different channels based on the network provider being used, or based on the access or privilege level of computing device 110. For example, wireless AP 120B may assign a computing device 110 a communication channel based on whether the computing device 110 has access to private portions of the network.

It is noted that the present invention can be used for a plethora of applications and is not limited to the applications shown and/or described herein. In other words, the applications described herein are exemplary only, and the methods described herein may be used for any of various purposes and may be stored in and execute on any of various types of systems to perform any of various applications.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for providing access to a second network comprised in a network system, wherein the network system includes one or more access points coupled to a first network, the method comprising:

generating one or more access codes, wherein one or more access codes is associated with one or more attributes;

receiving an access code of the one or more access codes from a portable computing device coupled to a first access point of the one or more access points;

determining a current geographic location of the portable computing device, wherein at least one attribute of the one or more attributes is associated with a geographic location of validity;

determining if the access code is valid, wherein said determining if the access code is valid includes using the current geographic location of the computing device and the at least one attribute associated with a geographic location, wherein if the geographic location of the portable computing device is within an area of the geographic location of validity, then the access code is valid; and if the access code is valid, providing access to the second network for the portable computing device, wherein said providing is based on at least one attribute of the one or more attributes, and wherein said access to the second network includes access to one or more services of the second network.

2. The method of claim 1, wherein each attribute of a subset of attributes of the one or more attributes is associated with a service of the second network.

3. The method of claim 1, further comprising:

determining a geographic location of the computing device;

wherein at least one attribute of the one or more attributes is associated with a geographic location;

wherein said providing is based upon the geographic location of the computing device and the at least one attribute associated with the geographic location.

4. The method of claim 1, wherein at least one attribute of the one or more attributes is associated with a quality of service (Qos);

wherein said providing is based upon the at least one attribute associated with the QoS.

5. The method of claim 1, wherein the access code is associated with an expiration time;

wherein said determining includes determining a time and determining if the time is past the expiration time, wherein the access code is not valid if the time is past the expiration time.

6. The method of claim 1, further comprising:
a user receiving the access code from a communications device.

7. The method of claim 6, further comprising:
the user requesting the access code, wherein the user uses the communications device for said requesting.

8. The method of claim 1, wherein the computing device is a portable computing device.

9. The method of claim 1, wherein the second network comprises the Internet.

10. The method of claim 1, wherein the second network comprises a corporate network.

11. The method of claim 1, wherein the first access point and the computing device communicate in a wired fashion.

12. The method of claim 1, wherein the first access point and the computing device communicate in a wireless fashion.

13. The method of claim 1,
wherein said determining includes accessing a database and searching for the access code, wherein if the access code is not found, then the access code is not valid.

14. The method of claim 13, further comprising:
if the access code is found, retrieving one or more attributes associated with the access code.

15. The method of claim 1, further comprising:
a venue associate providing the access code to a user, wherein the venue associate provides the access code to the user for the user's patronage to a venue.

16. The method of claim 1, further comprising:
transmitting one or more access codes from said generating to one or more computing devices.

17. The method of claim 16,
wherein a distribution unit performs said transmitting.

18. The method of claim 1, further comprising:
distributing one or more access codes from said generating to one or more users.

19. The method of claim 18,
wherein a distribution unit performs said distributing.

20. The method of claim 1, further comprising:
storing one or more access codes from said generating in a memory medium.

21. The method of claim 1, further comprising:
storing one or more access codes from said generating in a database.

22. The method of claim 1, further comprising:
printing one or more access codes from said generating.

23. A method for providing access to a second network comprised in a network system, wherein the network system includes one or more access points coupled to a first network, the method comprising:
generating one or more access codes;
receiving an access code of the one or more access codes from a portable computing device coupled to a first access point of the one or more access points;
determining if the access code is valid;
if the access code is valid, providing access to the second network for the computing device, wherein said access to the second network includes access to one or more services of the second network,
wherein the first access point and the computing device communicate using wireless Ethernet (IEEE 802.11);
wherein the first access point is operable to concurrently utilize a plurality of IEEE 802.11 service set identifications (SSIDs);
wherein the access code is associated with a first IEEE 802.11 service set identification (SSIDs);
wherein the portable computing device uses an IEEE 802.11 service set identification (SSIDs) of the computing device; and
wherein said determining includes determining if the first IEEE 802.11 service set identification (SSIDs) matches the IEEE 802.11 service set identification (SSIDs) of the computing device, wherein if the first IEEE 802.11 service set identification (SSIDs) does not match the IEEE 802.11 service set identification (SSIDs) of the portable computing device, then the access code is not valid.

24. The method of claim 23,
wherein the plurality of IEEE 802.11 system identifications include IEEE 802.11 service set identifications (SSIDs).

25. The method of claim 23,
wherein the plurality of IEEE 802.11 SSIDs include IEEE 802.11 basic service set identifications (BSSIDs).

26. The method of claim 23,
wherein the plurality of IEEE 802.11 SSIDs include IEEE 802.11 extended service set identifications (ESSIDs).

27. A computer system for providing and controlling access to a second network from a first network, the computer system comprising:
a first network interface coupled to the first network;
a second network interface coupled to the second network;
a CPU;
a memory coupled to the CPU, wherein the memory stores program instructions which are executable by the CPU to:
receive an access code from a portable computing device coupled to the first network;
determine if the access code is valid; and
provide access to the second network for the portable computing device if the access code is valid, wherein providing access to the second network includes controlling access between the first network interface and the second network interface;
determine a geographic location of the portable computing device;
wherein at least one attribute of the one or more attributes is associated with a geographic location of validity;
wherein determining if the access code is valid includes using the geographic location of the portable computing device and the at least one attribute associated with a geographic location, wherein if the geographic location of the portable computing device is within an area of the geographic location of validity, then the access code is valid; and
wherein said access to the second network includes access to one or more services of the second network.

28. The computer system of claim 27,
wherein the access code is associated with one or more attributes;
wherein providing access to the second network for the computing device is based on at least one attribute of the one or more attributes.

29. The computer system of claim 28, wherein each attribute of a subset of attributes of the one or more attributes is associated with a service of the network.

30. The computer system of claim 28, wherein the memory stores program instructions which are further executable by the CPU to:
determine a geographic location of the computing device;
wherein at least one attribute of the one or more attributes is associated with a geographic location;
wherein providing access to the second network for the computing device is based upon the geographic location of the computing device and the at least one attribute associated with a geographic location.

31. The computer system of claim 28,
wherein at least one attribute of the one or more attributes is associated with a quality of service (QoS);
wherein providing access to the second network for the computing device is based upon the QoS.

32. The computer system of claim 27,
wherein the access code is associated with an expiration time;
wherein determining if the access code is valid includes determining a time and determining if the time is past the expiration time, wherein the access code is not valid if the time is past the expiration time.

33. The computer system of claim 27, wherein the computing device is a portable computing device.

34. The computer system of claim 27, wherein the second network comprises the Internet.

35. The computer system of claim 27, wherein the second network comprises a corporate network.

36. The computer system of claim 27,
wherein the first network interface comprises a wireless network interface coupled to a transceiver;
wherein the computer system and the computing device communicate in a wireless fashion;
wherein the first network includes the computer system and the computing device communicating in a wireless fashion.

37. The computer system of claim 36,
wherein the computer system and the computing device communicate using wireless Ethernet (IEEE 802.11);
wherein the computer system is operable to concurrently utilize a plurality of IEEE 802.11 system identifications;
wherein the access code is associated with a first IEEE 802.11 system identification;
wherein the computing device uses an IEEE 302.11 system identification of the computing device; and
wherein determining if the access code is valid includes determining if the first IEEE 802.11 system identification matches the IEEE 802.11 system identification of the computing device, wherein if the first IEEE 802.11 system identification does not match the IEEE 802.11 system identification of the computing device, then the access code is not valid.

38. The computer system of claim 37,
wherein the plurality of IEEE 802.11 system identifications include IEEE 802.11 service set identifications (SSIDs).

39. The computer system of claim 37,
wherein the plurality of IEEE 802.11 system identifications include IEEE 802.11 basic service set identifications (BSSIDs).

40. The computer system of claim 37,
wherein the plurality of IEEE 802.11 system identifications include IEEE 802.11 extended service set identifications (ESSIDs).

41. The computer system of claim 27,
wherein determining if the access code is valid includes accessing a database and searching for the access code, wherein if the access code is not found, then the access code is not valid.

42. The computer system of claim 41, wherein the memory stores program instructions which are further executable by the CPU to:
determine if the access code was found; and
retrieve one or more attributes associated with the access code, if the access code was found.

43. The computer system of claim 27, wherein the memory stores program instructions which are further executable by the CPU to:
generate a second access code.

44. The computer system of claim 27, wherein the memory stores program instructions which are further executable by the CPU to:
store the second access code in a memory medium.

45. The computer system of claim 27, wherein the memory stores program instructions which are further executable by the CPU to:
transmit the second access code to a database.

46. The computer system of claim 27,
wherein the computer system is coupled to a printing device;
wherein the memory stores program instructions which are further executable by the CPU to:
transmit the second access code to the printing device.

47. A network system, comprising:
a first network;
a second network;
a computer system, wherein the computer system is coupled to the first network, wherein the computer system is coupled to the second network;
one or more access points coupled to the first network, wherein each of the one or more access points is operable to communicate with a computing device;
wherein the computing device communicates through a first access point of the one or more access points;
wherein the computer system is operable to receive an access code from the computing device, determine if the access code is valid, and provide access to the second network for the computing device if the access code is valid;
wherein said access to the second network includes access to one or more services of the second network;
wherein the access code is associated with one or more attributes;
wherein the computer system is further operable to provide access or services of the second network based on at least one of the one or more attributes;
wherein each attribute of a subset of attributes of the one or more attributes is associated with a service of the network;
wherein the computer system is further operable to determine a geographic location of the computing device;
wherein at least one attribute of the one or more attributes associated with the access code is associated with a geographic location; and
wherein the computer system is further operable to provide access or services of the second network based on the geographic location of the computing device and the at least one attribute of the one or more attributes associated with the access code is associated with the geographic location.

48. The network system of claim 47, wherein the geographic location of the computing device includes a geographic location of the first access point.

49. The network system of claim 47, further comprising:
a management information base (MIB) coupled to the first network;
wherein the computer system is further operable to access information in the MIB and use the information to determine the geographic location of the computing device.

50. The network system of claim 49, wherein the geographic location of the computing device includes a geographic location of the first access point.

51. The network system of claim 47,
wherein the computer system is further operable to determine a geographic location of the first access point;
wherein at least one attribute of the one or more attributes associated with the access code is associated with a geographic location;
wherein the computer system is further operable to provide access or services of the second network based on the geographic location of the first access point and the at least one attribute of the one or more attributes associated with the access code is associated with the geographic location.

52. The network system of claim 51, further comprising:
a management information base (MIB) coupled to the first network;
wherein the computer system is further operable to access information in the MIB and use the information to determine the geographic location of the first access point.

53. The network system of claim 47,
wherein at least one attribute of the one or more attributes is associated with a quality of service (QoS);
wherein providing access to the second network for the computing device is based upon the QoS.

54. The network system of claim 47,
wherein the access code is associated with an expiration time;
wherein determining if the access code is valid includes determining a time and determining if the time is past the expiration time, wherein the access code is not valid if the time is past the expiration time.

55. A carrier medium comprising program instructions for providing access to a second network to a computing device coupled to a first network, wherein the program instructions are computer-executable to implement:
generating one or more access codes;
receiving an access code of the one or more access codes from the computing device coupled to the first network;
determining if the access code is valid; and
providing access to the second network for the computing device if the access code is valid, wherein said access to the second network includes access to one or more services of the second network;
wherein the access code is associated with one or more attributes;
wherein said providing is based on at least one attribute of the one or more attributes;
determining a geographic location of the computing device;
wherein at least one attribute of the one or more attributes is associated with a geographic location of validity; and
wherein said determining if the access code is valid includes using the geographic location of the computing device and the at least one attribute associated with a geographic location, wherein if the geographic location of the computing device is within an area of the geographic location of validity, then the access code is valid.

56. The carrier medium of claim 55,
wherein the access code is associated with one or more attributes;
wherein said providing is based on at least one attribute of the one or more attributes;
determining a geographic location of the computing device;
wherein at least one attribute of the one or more attributes is associated with a geographic location of validity; and
wherein said determining if the access code is valid includes using the geographic location of the computing device and the at least one attribute associated with a geographic location, wherein if the geographic location of the computing device is within an area of the geographic location of validity, ten the access code is valid.

57. The carrier medium of claim 56, wherein each attribute of a subset of attributes of the one or more attributes is associated with a service of the second network.

58. The carrier medium of claim 56,
wherein at least one attribute of the one or more attributes is associated with a quality of service (QoS);
wherein said providing is based upon the at least one attribute associated with the QoS.

59. The carrier medium of claim 55,
wherein the access code is associated with an expiration time;
wherein said determining includes determining a time and determining if the time is past the expiration time, wherein the access code is not valid if the time is past the expiration time.

60. The carrier medium of claim 55, wherein the computing device is a portable computing device.

61. The carrier medium of claim 55, wherein the second network comprises the Internet.

62. The carrier medium of claim 55, wherein the second network comprises a corporate network.

63. The carrier medium of claim 55,
wherein said determining includes accessing a database and searching for the access code, wherein if the access code is not found, then the access code is not valid.

64. The carrier medium of claim 63, wherein the program instructions are computer-executable to further implement:
retrieving one or more attributes associated with the access code, if the access code is found.

65. The carrier medium of claim 55, wherein the program instructions are computer-executable to further implement:
storing one or more access codes from said generating in a database.

66. The carrier medium of claim 55, wherein the program instructions are computer-executable to further implement:
storing one or more access codes from said generating in a memory medium.

67. The carrier medium of claim 55, wherein the program instructions are computer-executable to further implement:
transmitting one or more access codes from said generating to a printing device.

68. The carrier medium of claim 55, wherein the program instructions are computer-executable to further implement:
transmitting one or more access codes from said generating to a distribution unit.

* * * * *